(12) United States Patent
Vidal Ferrer et al.

(10) Patent No.: US 7,987,949 B2
(45) Date of Patent: Aug. 2, 2011

(54) PARKING BRAKE LEVER SYSTEM

(75) Inventors: Guillem Vidal Ferrer, Barcelona (ES);
Jaume Prat Terrades, Barcelona (ES);
Jordi Jornet Vidal, Terrassa (ES)

(73) Assignee: Fico Cables, S.A, Mollet del Vallès (ES)

( * ) Notice: Subject to any disclaimer, the term of this patent is extended or adjusted under 35 U.S.C. 154(b) by 859 days.

(21) Appl. No.: 11/813,392

(22) PCT Filed: Jan. 5, 2006

(86) PCT No.: PCT/EP2006/000054
§ 371 (c)(1),
(2), (4) Date: Jan. 24, 2008

(87) PCT Pub. No.: WO2006/072578
PCT Pub. Date: Jul. 13, 2006

(65) Prior Publication Data
US 2008/0110709 A1      May 15, 2008

(30) Foreign Application Priority Data

Jan. 5, 2005   (DE) .......................... 10 2005 000 804

(51) Int. Cl.
*F16D 65/30* (2006.01)
*B60T 7/10* (2006.01)
(52) U.S. Cl. ................... 188/2 D; 188/265; 74/501.5 R; 74/502
(58) Field of Classification Search ................ 188/2 D, 188/265; 74/502, 503, 504, 501.6, 516, 523, 74/540, 501.5 R, 491, 517; 267/153; 248/633
See application file for complete search history.

(56) References Cited

U.S. PATENT DOCUMENTS

| | | | | |
|---|---|---|---|---|
| 2,274,133 A | * | 2/1942 | Fergueson | 74/503 |
| 2,632,338 A | * | 3/1953 | Sandberg | 74/503 |
| 2,716,902 A | * | 9/1955 | Skareen | 74/503 |
| 3,375,731 A | * | 4/1968 | De Lacroix | 74/516 |
| 3,397,856 A | * | 8/1968 | Sullivan et al. | 248/633 |
| 3,466,943 A | * | 9/1969 | De Lacroix | 74/516 |
| 4,240,307 A | | 12/1980 | Yamazaki et al. | |
| 4,614,130 A | * | 9/1986 | Heismann et al. | 74/523 |
| 2007/0209469 A1 | * | 9/2007 | Otto | 74/523 |

FOREIGN PATENT DOCUMENTS

| | | |
|---|---|---|
| DE | 3529696 A1 | 3/1986 |
| DE | 10123525 A1 | 5/2002 |
| DE | 10156920 A1 | 12/2002 |
| EP | 1179463 A1 | 2/2002 |
| EP | 1205368 | 5/2002 |

(Continued)

*Primary Examiner* — Thomas J Williams
(74) *Attorney, Agent, or Firm* — John D. Titus

(57) ABSTRACT

The present invention relates to parking brake lever system 1 for manually tightening and releasing of at least one brake cable 90, wherein the parking brake lever system 1 comprises at least one rotation arm 10, 12 pivotably supported at a fixed support 50, wherein the rotation arm 10, 12 is connected to the brake cable 90, and at least one actuation lever 20, 22, which at a first end thereof is pivotably connected to the rotation arm 10, 12 and which at a second end thereof is rigidly connected to a hand grip 40, wherein the actuation lever 20, 22 is slidingly supported at the fixed support 50, such that the hand grip 40 defines a curved path during actuation of the parking brake lever system 1.

16 Claims, 14 Drawing Sheets

FOREIGN PATENT DOCUMENTS

Figure 1:
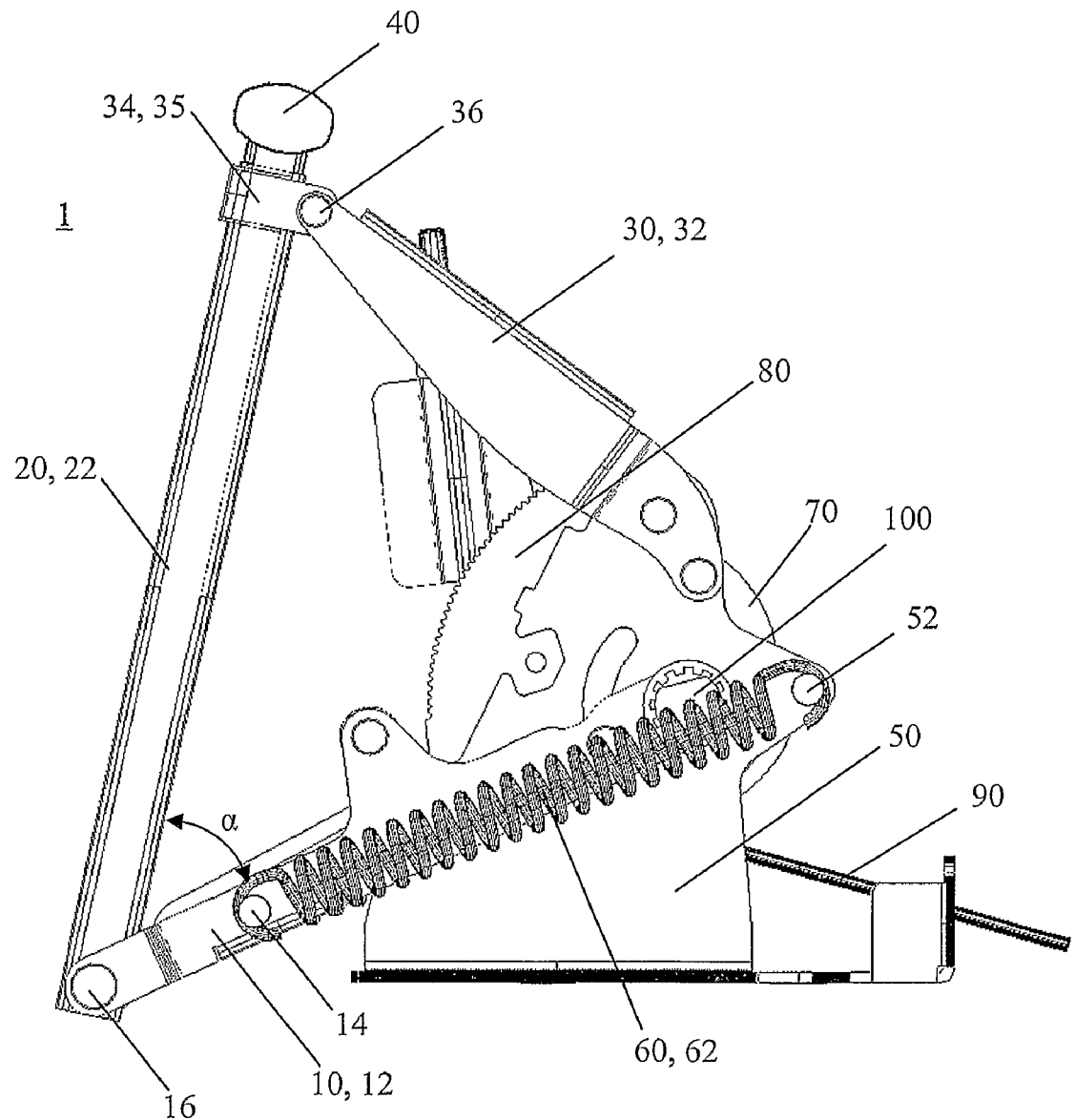

| | | |
|---|---|---|
| FR | 2748438 A1 | 11/1997 |
| FR | 2753947 A1 | 4/1998 |
| JP | 54025027 A * | 2/1979 |
| JP | 62 1 22 855 A | 6/1987 |
| JP | 02 0 20 459 A | 1/1990 |
| JP | 09 2 26 544 A | 9/1997 |

* cited by examiner

PARKING BRAKE LEVER SYSTEM

1. TECHNICAL FIELD

The present invention relates to a parking brake lever system for the actuation of a parking brake, particularly of a parking brake for motor vehicles, wherein the parking brake lever system is manually actuated.

2. PRIOR ART

In the prior art different possibilities are disclosed to tighten a parking brake. Parking brakes in motor vehicles in general act on the rear wheels of the vehicle and are actuated via brake cables. For tightening of the brake cable either a parking brake lever or a foot pedal is used. Usually parking brake levers are mounted at the middle tunnel of the motor vehicle between the front seats.

During design and ergonomic considerations, however, other positions in a motor vehicle are conceivable. So, it can for example be desirable to integrate a parking brake lever in the dashboard or center console of a motor vehicle. So, for example the EP 1 205 368 A2 shows a parking brake lever which is integrated in the center console of a vehicle. Therein, the mentioned parking brake lever is vertically arranged at one side of the center console and performs a pure pivoting movement around a horizontal axis in direction of the passenger compartment during tightening of the parking brake.

Such a pivoting movement of a parking brake lever can be undesired for design or ergonomic reasons.

From the DE 101 56920 A1 and the DE 101 23 525 parking brakes are known, which transform a pure axial displacement of a hand grip into a tension of the brake cable. The shown parking brakes comprise a plurality of intermediate elements, which is intended to act force-intensifying, for transforming the pure axial movement into the tension of the brake cable.

Such a pure axial movement of a parking brake lever can also be undesired for design or ergonomic reasons, such that there is the need for a parking brake lever system, which can on the one hand be flexibly integrated into the design of the vehicle and on the other hand comprises an enhanced ergonomics during the actuation. Further, since the parking brake lever system is a security relevant part it must meet particular requirements with respect to stability and reliability. A further goal of the invention is it to provide a cost-efficient parking brake lever system.

3. SUMMARY OF THE INVENTION

The present invention solves this problem by providing a parking brake lever which the movement of the lever is arcuate, rather than purely axial.

Particularly this problem is solved by a parking brake lever system for manually tightening and releasing of at least one brake cable, wherein the parking brake lever system comprises at least one rotation arm pivotably supported at a fixed support, wherein the rotation arm is connected to the brake cable, and at least one actuation lever, which at a first end thereof is pivotably connected to the rotation arm and which at a second end thereof is rigidly connected to a hand grip, wherein the actuating lever is slidingly supported at the fixed support, such that the hand grip defines a curved path during actuation of the parking brake lever system.

The special kinematic arrangement of the actuation lever with respect to the pivotably supported rotation arm leads to a particular actuation kinematics. For the tightening of a parking brake, the hand grip of the parking brake lever system according to the invention can be manually actuated by means of a movement, which is combined of an axial movement and a pivoting movement. Therefore, on the one hand a particularly harmonic and ergonomic way of actuation results, in that the user does not have to unnaturally bend its wrist. On the other hand such a parking brake lever system can particularly preferred be arranged at the dashboard or center console of a motor vehicle, due to its compact construction. A long actuation lever, as used in conventional parking brake is not necessary. Therefore, particular design possibilities result, which would not be possible having a conventional parking brake lever system.

In a preferred embodiment the actuation lever of the parking brake lever system comprises a bar-like shape and it is slidingly supported in-between the first end, which is connected to the rotation arm, and the second end, which is connected to a hand grip. Due to the bar-like shape and the sliding support, it results a particularly simple and cost-efficient embodiment of the parking brake lever system according to the invention.

In a further preferred embodiment the parking brake lever system further comprises a slide support element, which is pivotably supported at the fixed support, for the sliding support of the actuation lever. During this motion the actuation lever does not only slide along the fixed support, but it is simultaneously also slightly tilted. In order to guarantee during this movement a guiding of the actuation lever at the fixed support without clearance, the connection between the actuation lever and the fixed support can be pivoted.

In a further preferred embodiment the parking brake lever system further comprises at least one tension spring, which is suspended between the rotation arm and the fixed support, to apply a tension force to the rotation arm in tightening direction. The at least one tension spring therefore acts force-intensifying, so that the user has only to apply a smaller force as without a spring to actuate the parking brake. Further, a tension spring is easier to mount and substantially more cost-efficient than for example compression springs or gas pressure elements. Preferably, the tension spring is dimensioned, such that the user on the one hand is effectively assisted during actuation, but on the other hand the parking brake lever system is automatically returned to its non-actuated state.

In a further preferred embodiment the parking brake lever system further comprises a cable guiding, which is rigidly connected to the rotation arm and which comprises a recess in which the brake cable is guided. By means of such a simple cable guiding additional cable guiding elements are spared, which further leads to a cost reduction and increase of lifetime.

Preferably, the cable guiding comprises a receptacle, at which the brake cable is length-adjustably connected. In that way the initial suspension of the brake cable can be adjusted in a simple manner and without additional adjustment means.

In a further preferred embodiment the parking brake lever system comprises at least one support lever, which is rigidly connected to the fixed support and which is pivotably connected to the slide support element, to support the actuation lever.

In this embodiment the actuation lever is not directly supported at the fixed support, but via an additional support lever, which is rigidly connected to the fixed support. The support lever can be very stiffly provided, since it must not be manufactured together with the fixed support, but separately. Further, the kinematic structure of the parking brake lever system can easily be varied by different lengths of the support lever.

In this manner, particularly the curved path of the hand grip can be adjusted to the design of the vehicle and the ergonomic requirements.

In a further preferred embodiment the parking brake lever system comprises two actuation levers and/or two rotation arms and/or two support levers and/or two tension springs, wherein the hand grip connects the two actuation levers with each other to form a substantially U-shaped arrangement. A substantially U-shaped arrangement has stability advantages with respect to a substantially flat arrangement. Such a parking brake lever system forms a very stable framework, such that the reliability and security of the parking brake lever system is further improved.

In a further preferred embodiment, the angle between the rotation arm and the actuation lever ranges between 85° and 95° when the brake cable is tightened. If the angle between the rotation arm and the actuation lever ranges between 85° and 95° the parking brake lever system according to the invention comprises the largest effective lever arm, that means the pulling force, which is introduced by the user to the hand grip is most effectively converted into a pulling force on the brake cable. This is particularly advantageous in that range, in which the force on the brake cable should be maximum, namely in the tightened condition.

In a further preferred embodiment the parking brake lever system further comprises an actuation plate arranged within the hand grip, for releasing of the parking brake.

In another preferred embodiment the releasing of the parking brake is performed by rotating the hand grip.

Preferably, the parking brake lever system further comprises a wing, which connects the ends of the support levers with each other. This wing stabilizes the ends of the support lever. Preferably, the wing is rigidly mounted to a vehicle. In this case, the wing acts for the more stable mounting of the upper part of the parking brake lever system, such that the parking brake lever system is particularly warp resistant although the support levers can be made thinner.

Preferably, the parking brake lever system further comprises a damping plate, which is mounted between the support and the vehicle for damping of vibrations. The damping plate prevents incommoding motor vibrations of the vehicle from being transmitted to the hand of the driver during tightening of the parking brake.

Preferably, the parking brake lever system further comprises at least one cover element for passing through the at least one actuation lever into the passenger compartment of the vehicle. To this end the cover element comprises a support frame, which is rigidly mounted at the vehicle, and a slide element, which is displaceably supported within the support frame, wherein the actuation lever extends through the slide element. The cover element is integrated into the interior lining and provides a tight and optical pleasing passageway for the actuation levers. Further, it acts for the acoustic insulation and prevents draft. Due to the displaceable support of the slide element within the support frame, the cover element is nearly wear resistant and optimally adapted to the movement of the actuation lever.

Preferably, the support frame is curved perpendicularly to the displacement direction of the slide element. By means of the curvature of the support frame, and therefore also of the slide element, on the one hand particular design aspects can be realized, on the other hand the path of displacement of the slide element can be deflected. For example, the slide element can then be guided beneath the mounting areas of the cover element. Preferably, the curvature of the support frame comprises a wave shape.

Further preferred embodiments of the invention relate from the sub-claims.

4. SHORT DESCRIPTION OF THE DRAWINGS

Figure 2:
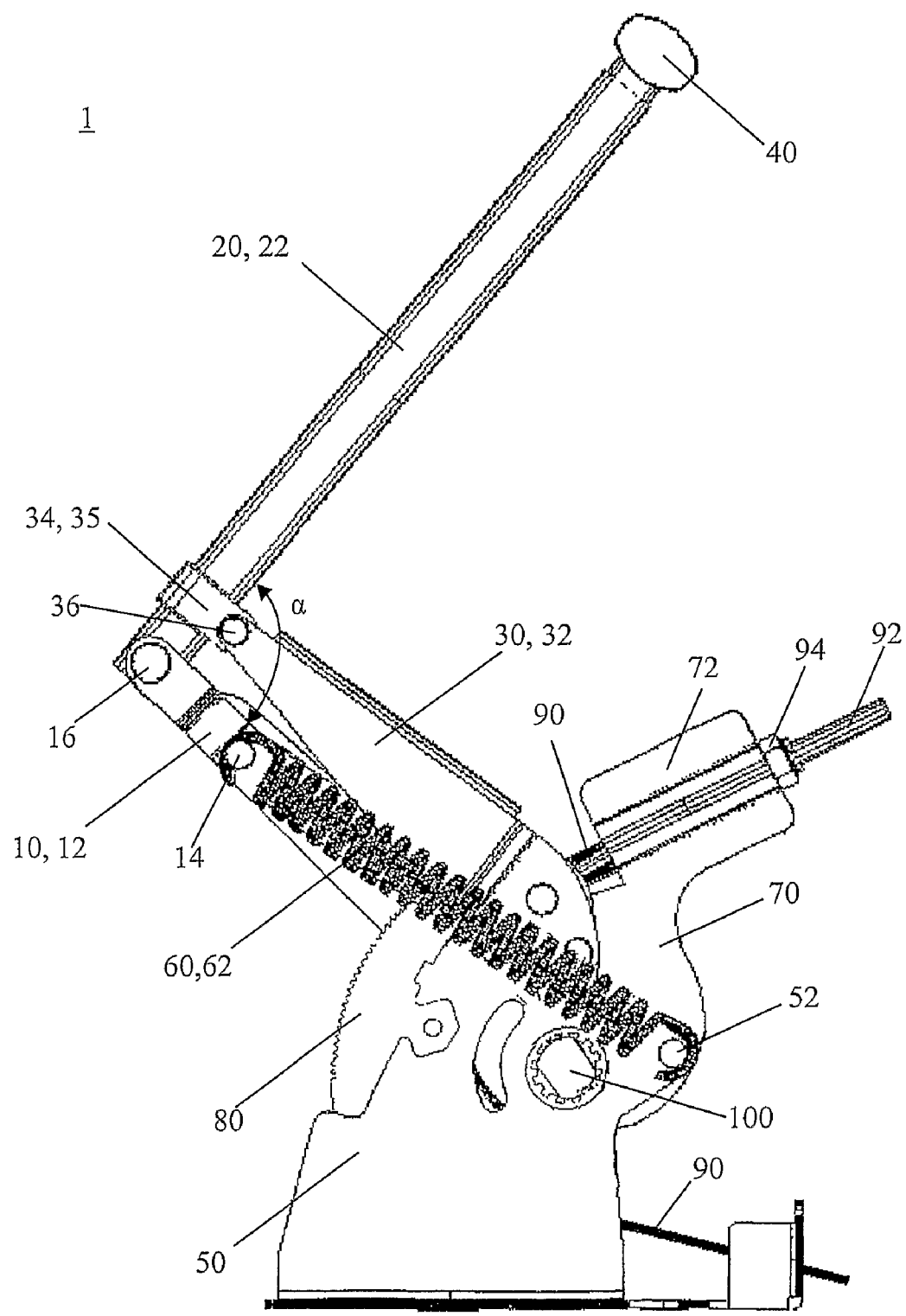
Figure 3:
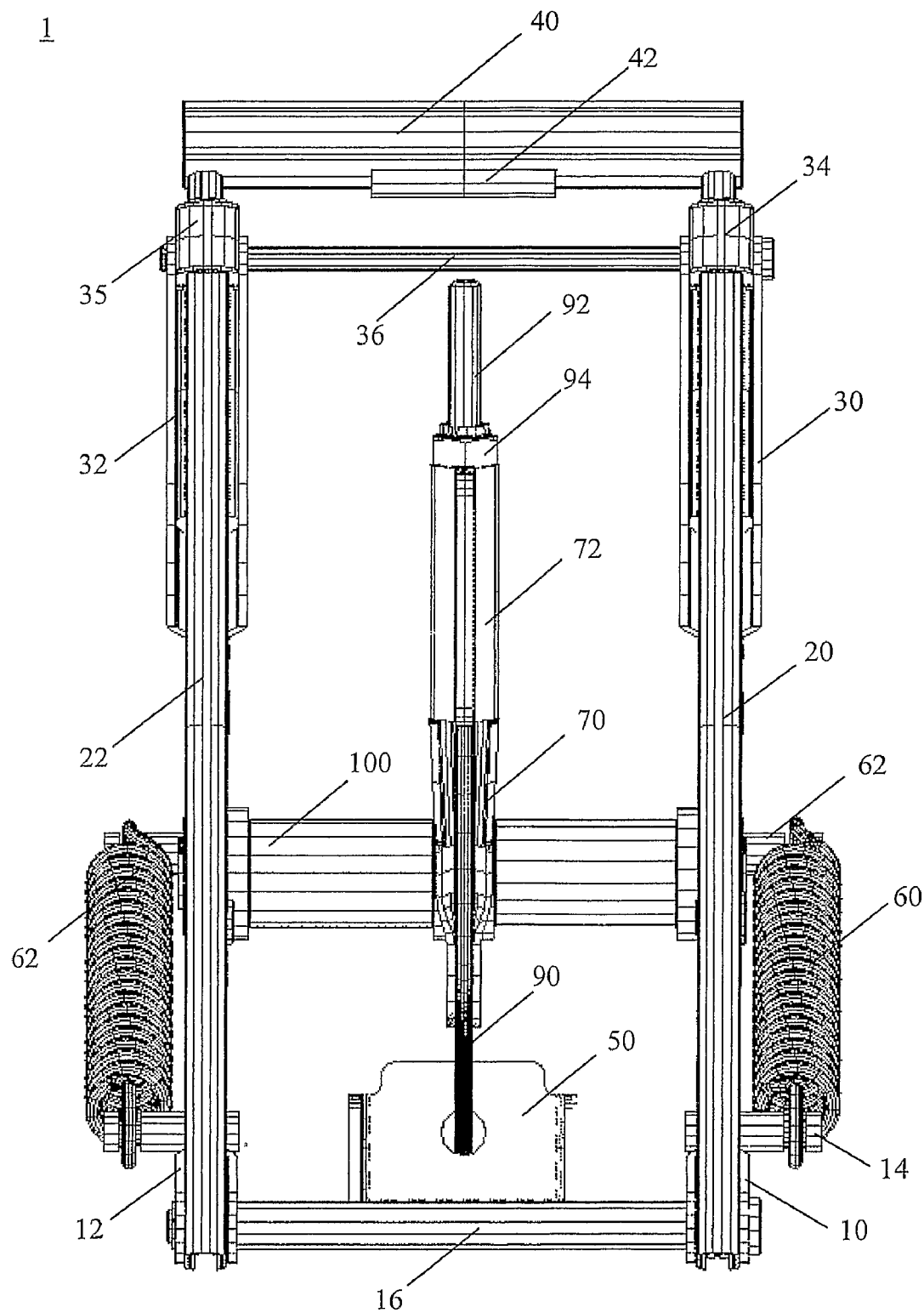
Figure 4:
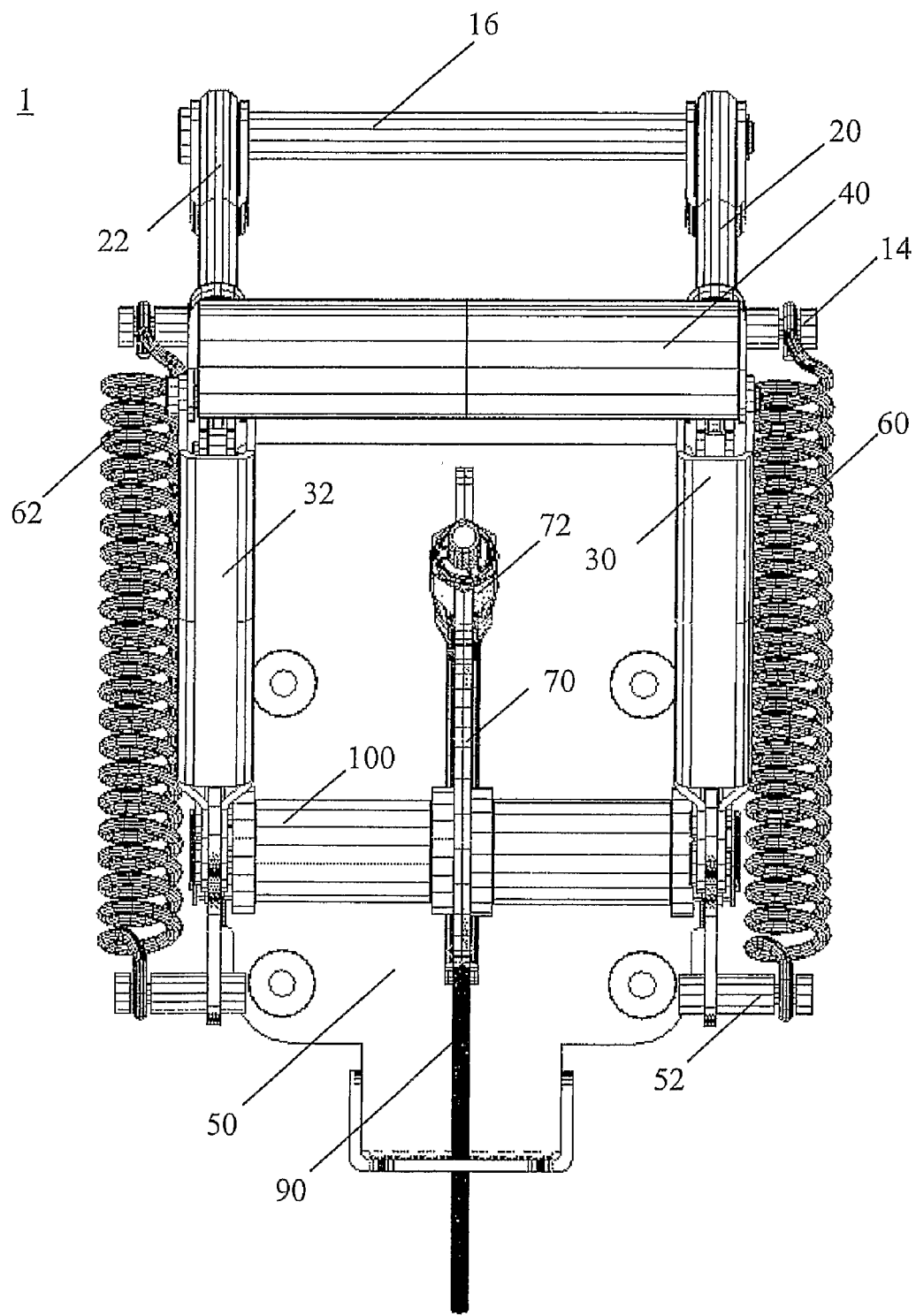
Figure 5:
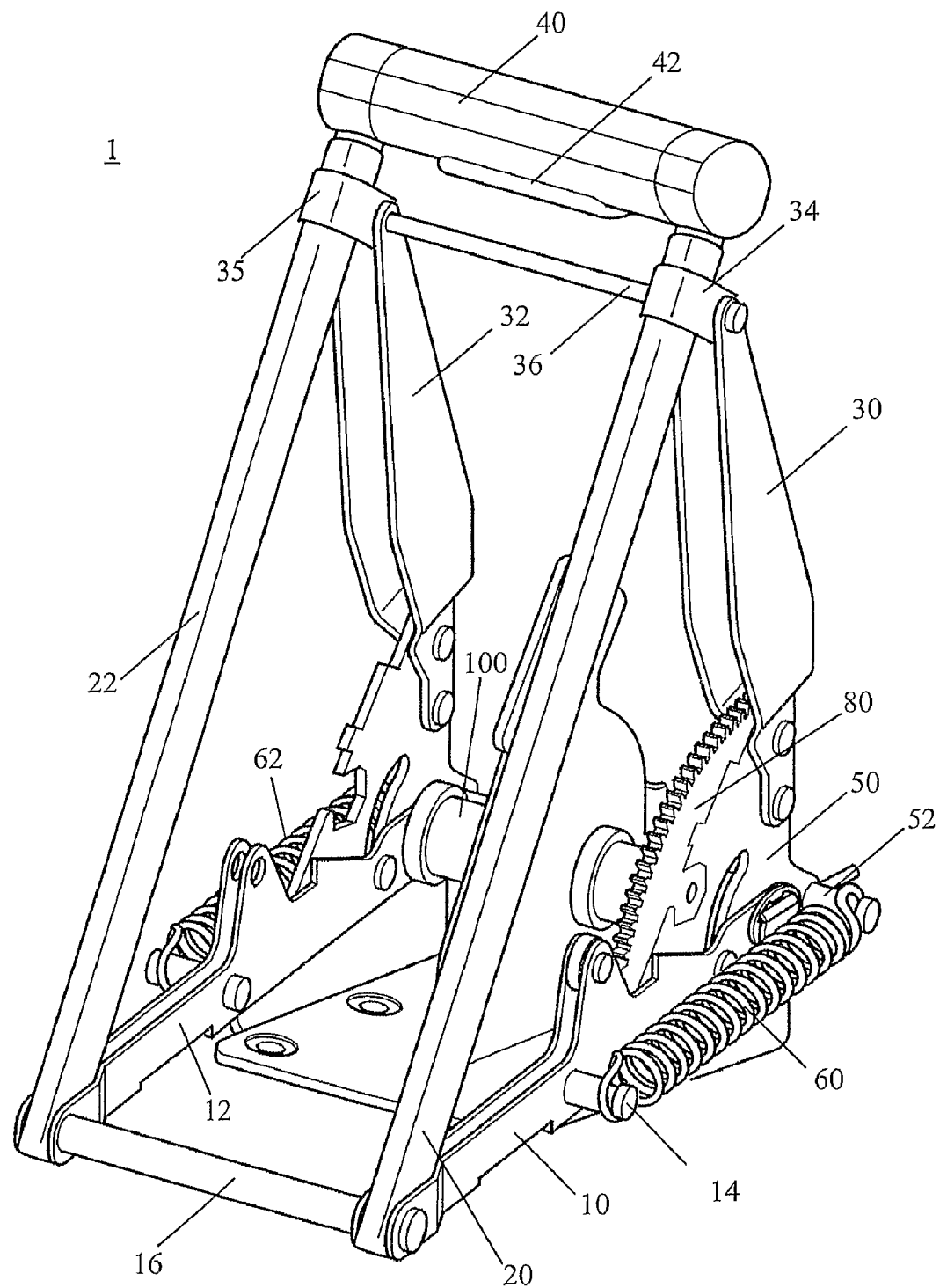
Figure 6:
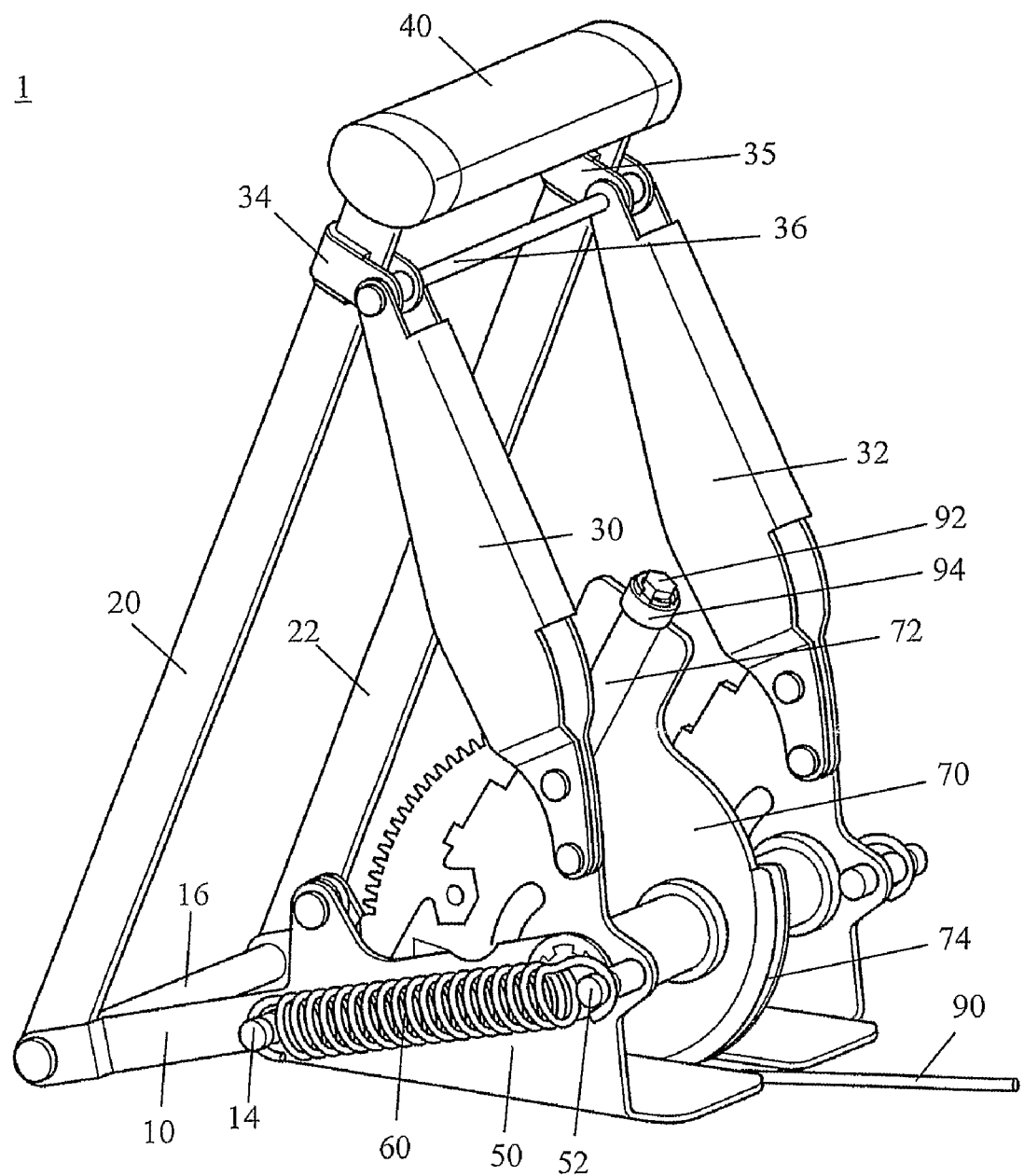
Figure 7:
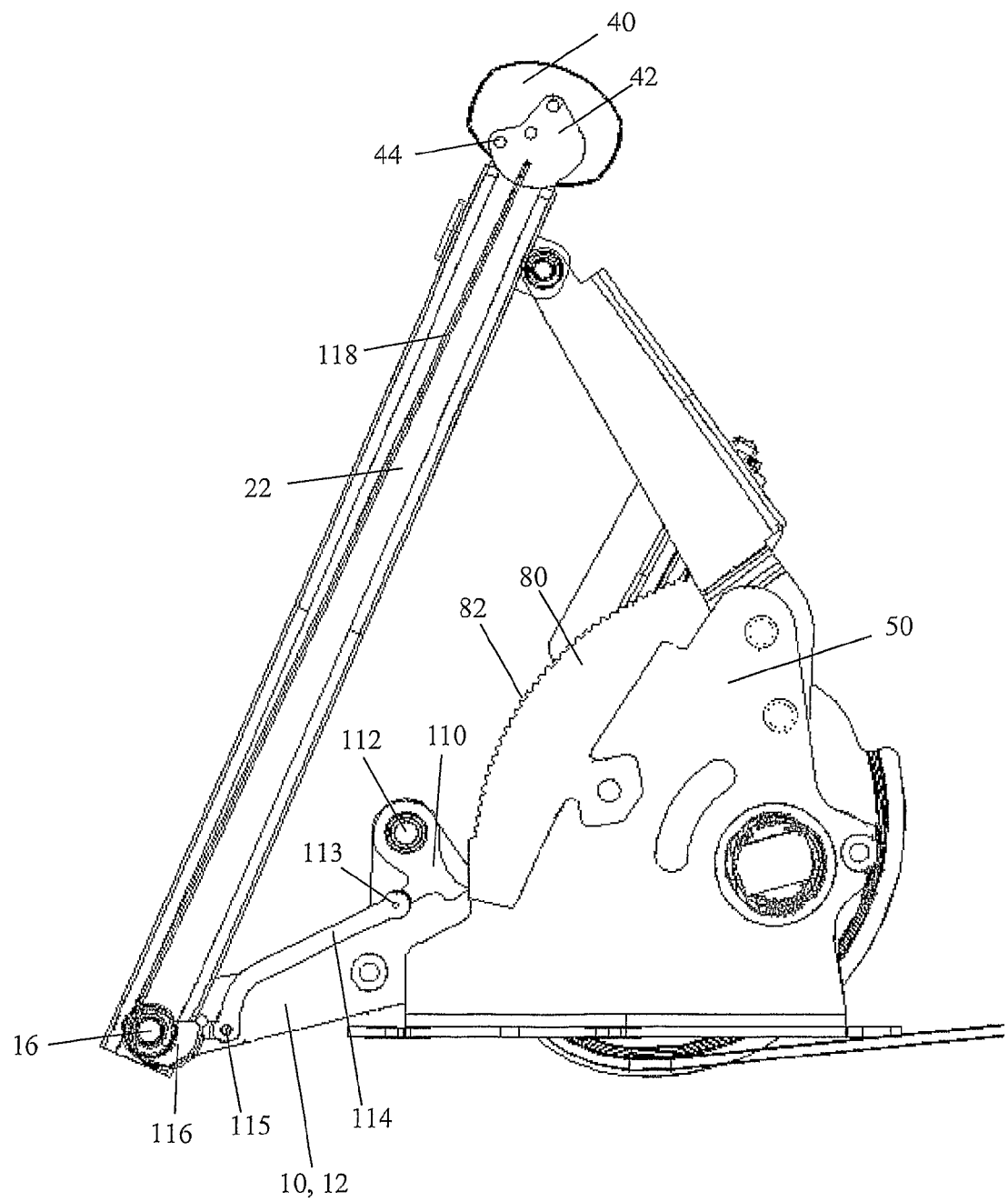
Figure 8:
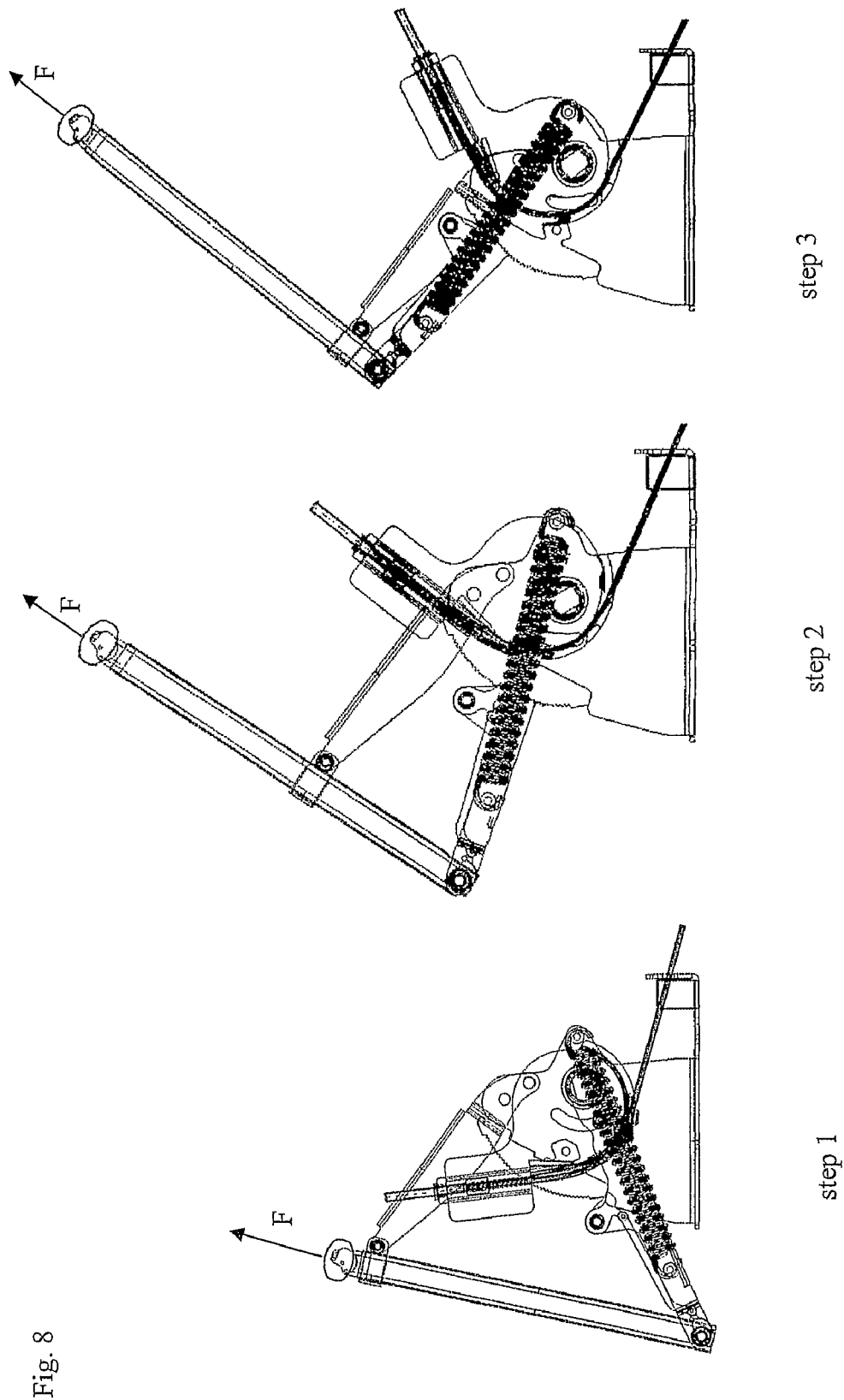
Figure 9:
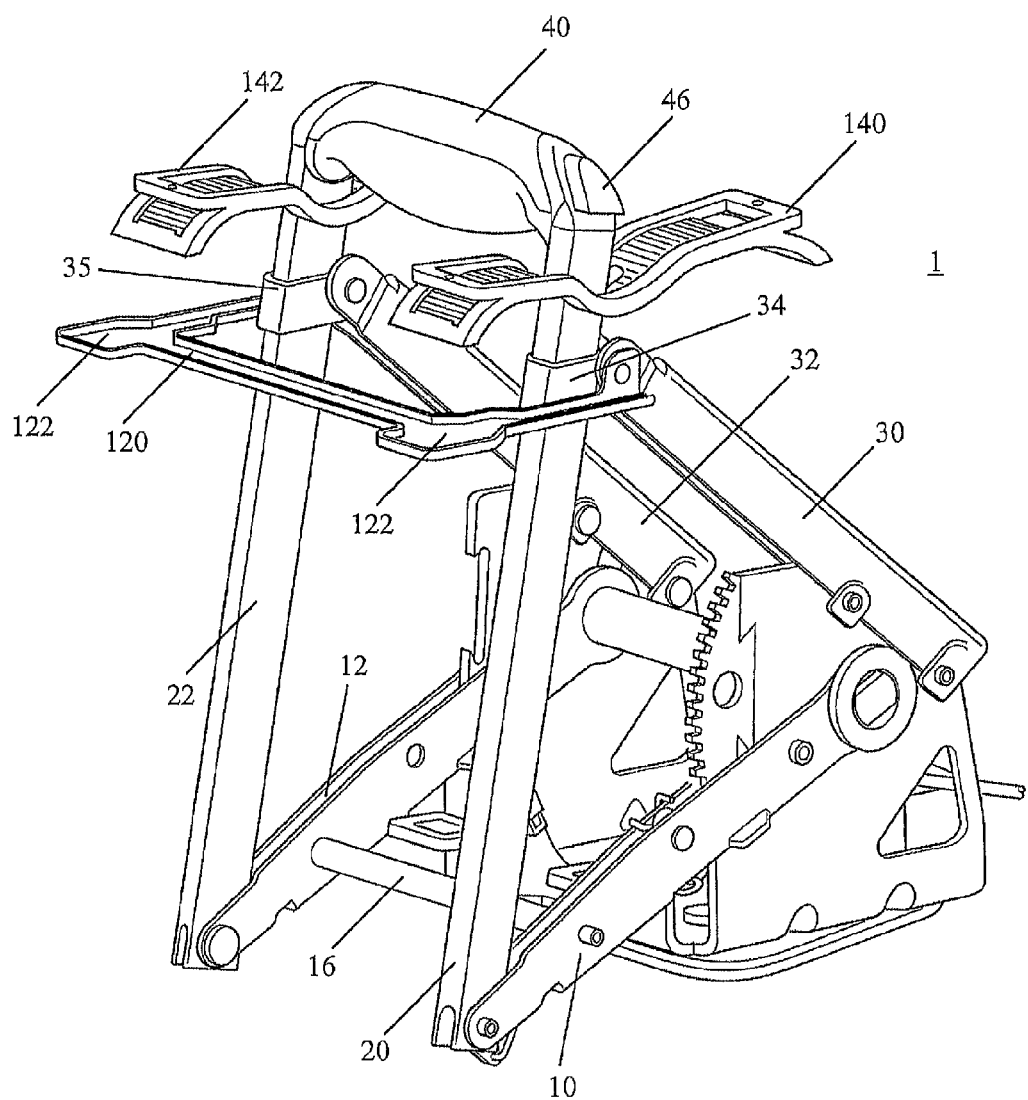
Figure 10:
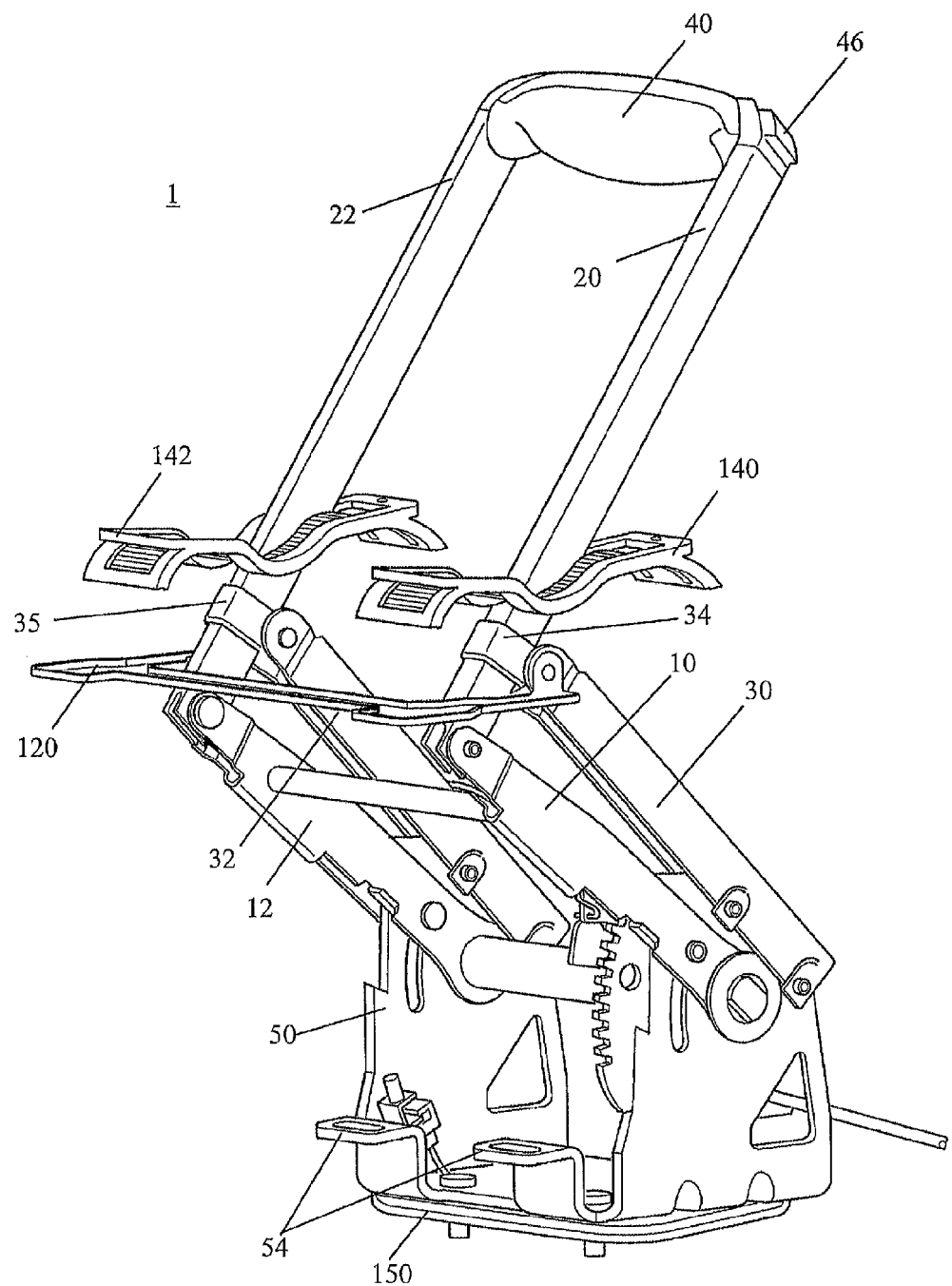
Figure 11:
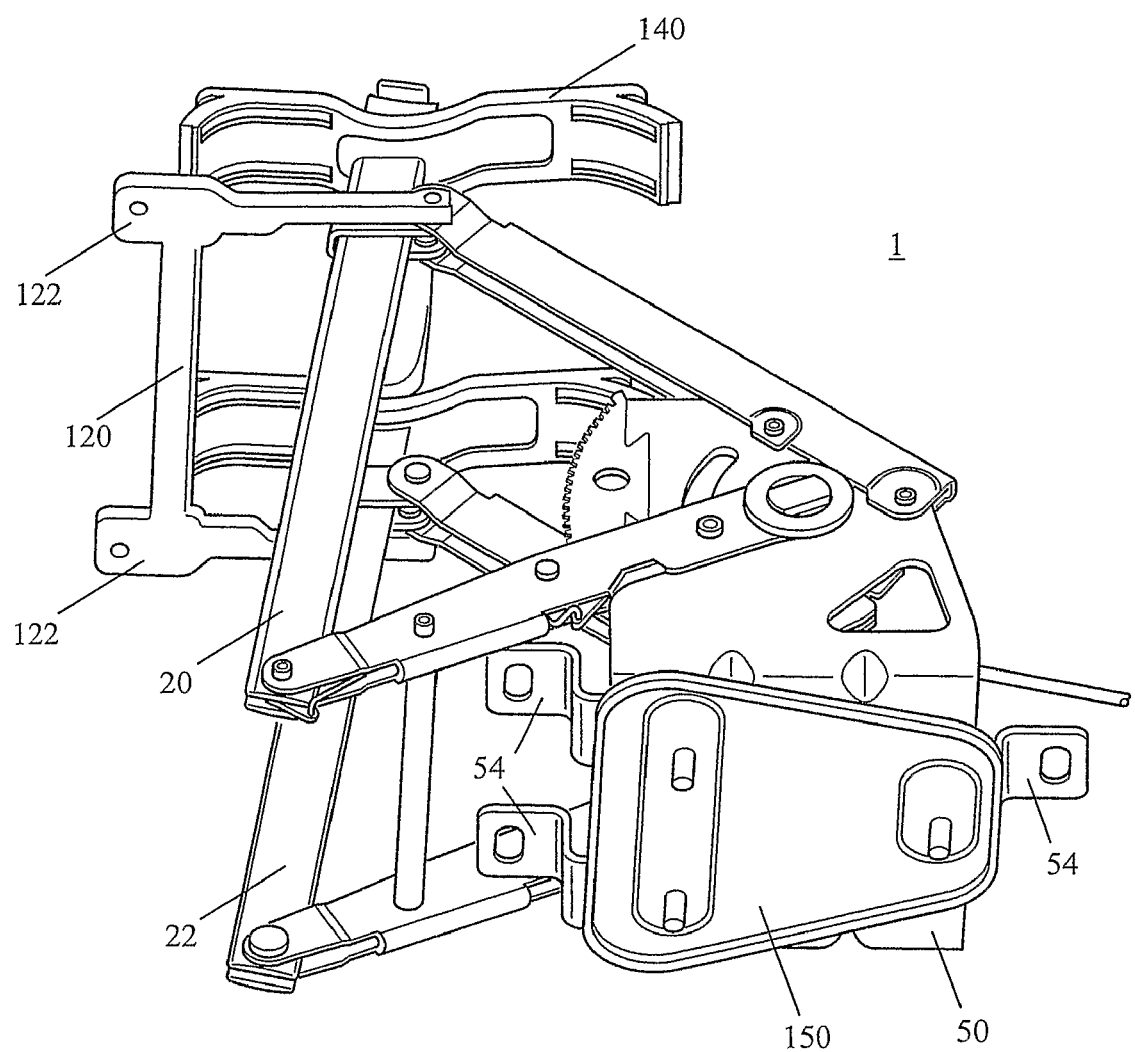
Figure 12:
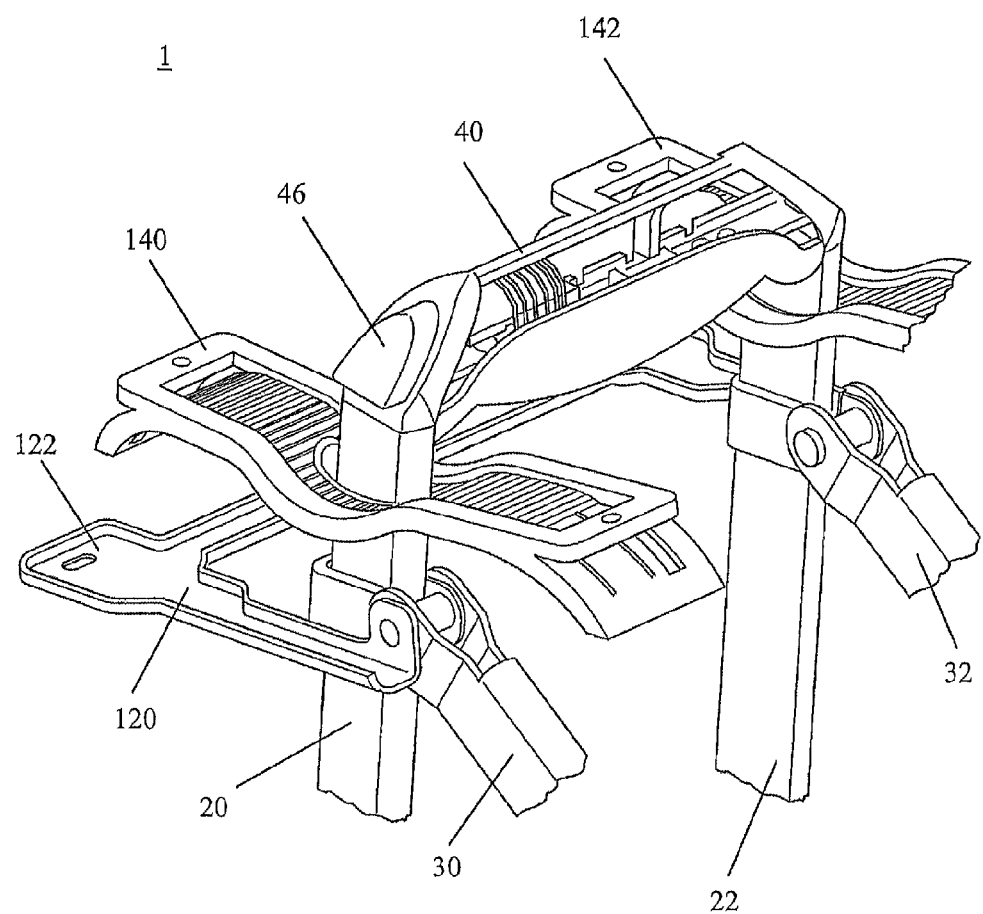
Figure 13A:
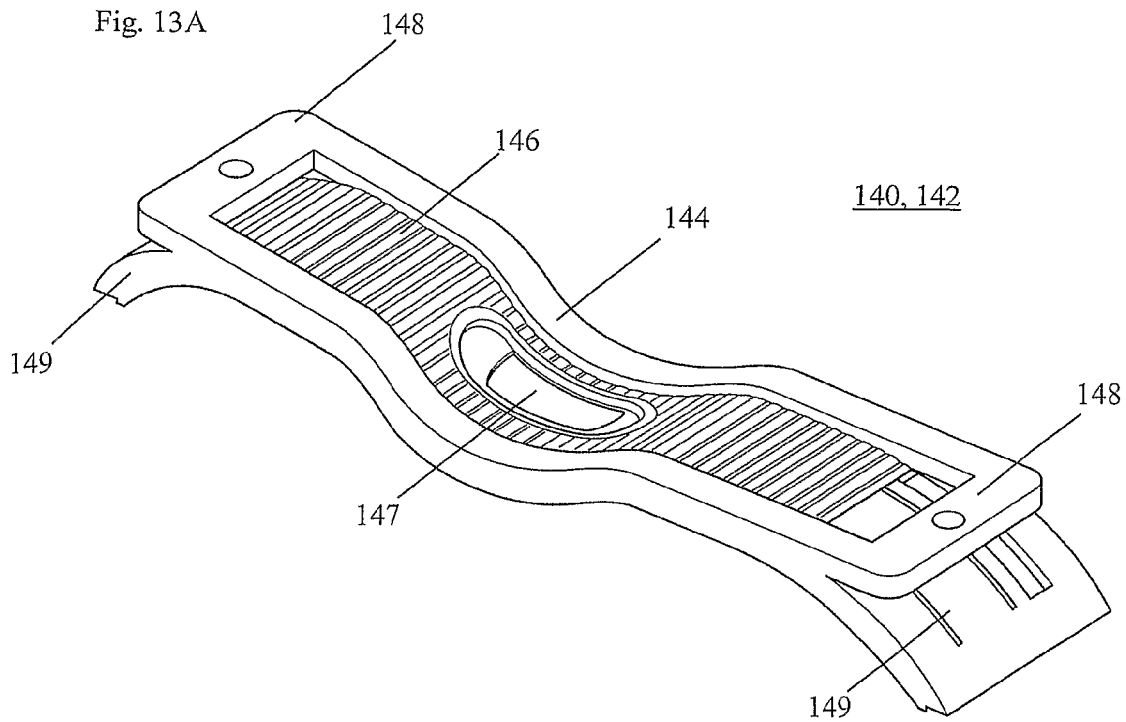
Figure 13B:
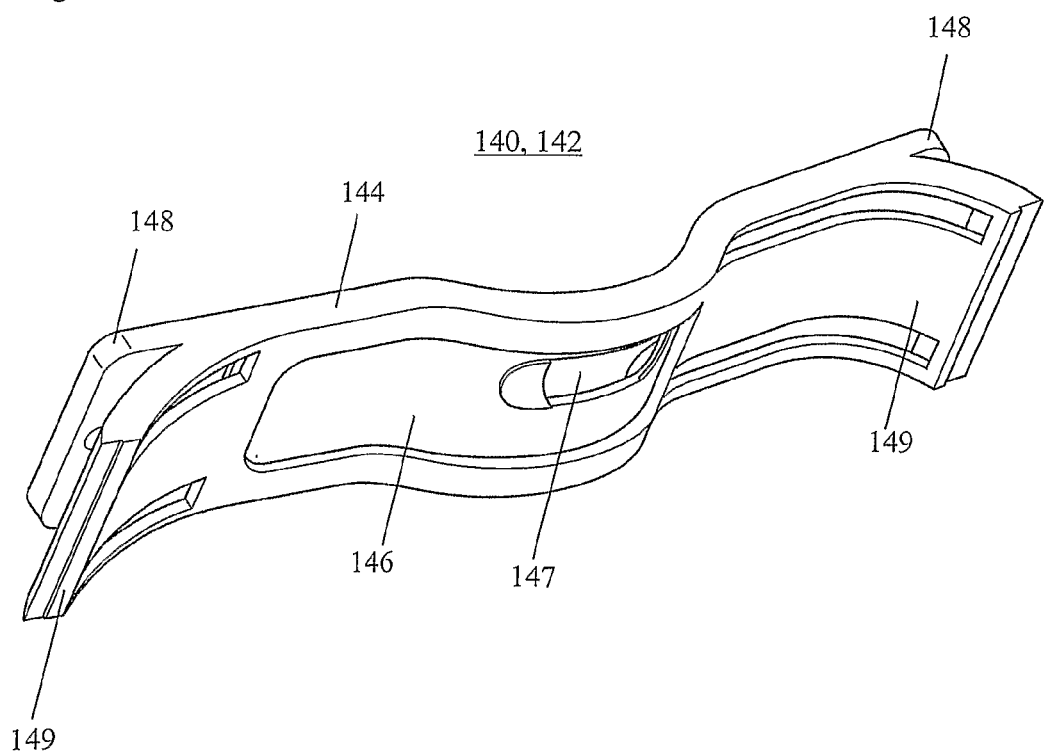
Figure 14A:
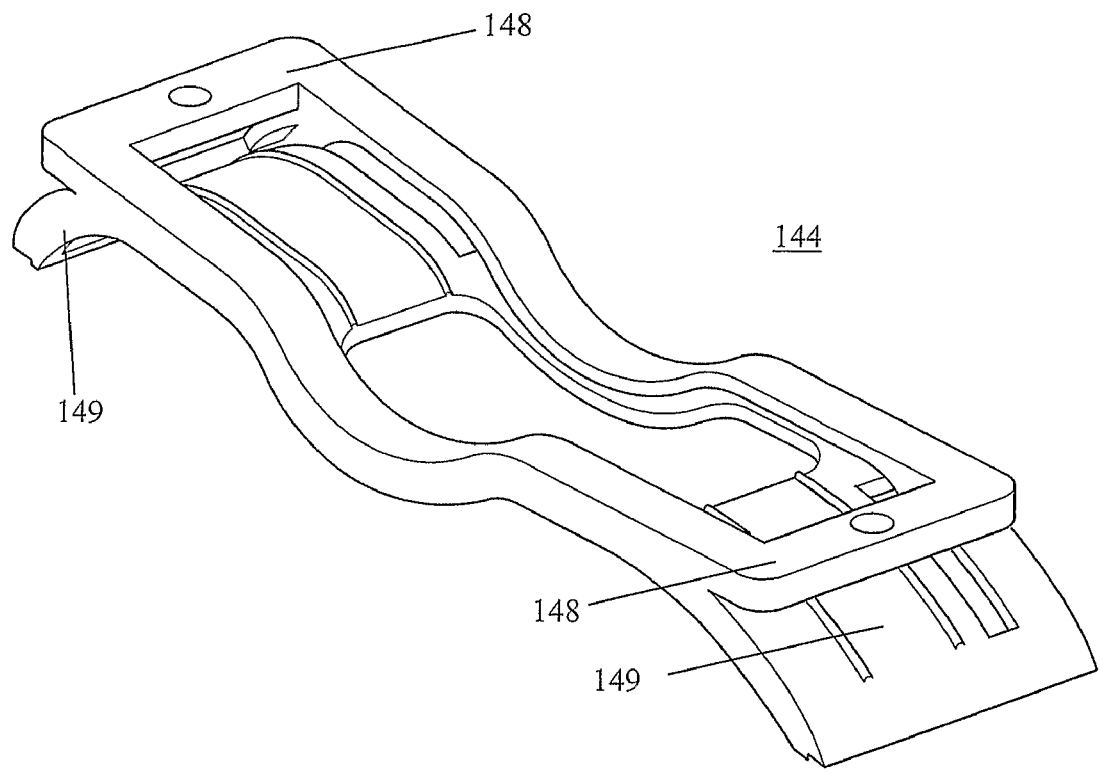
Figure 14B:
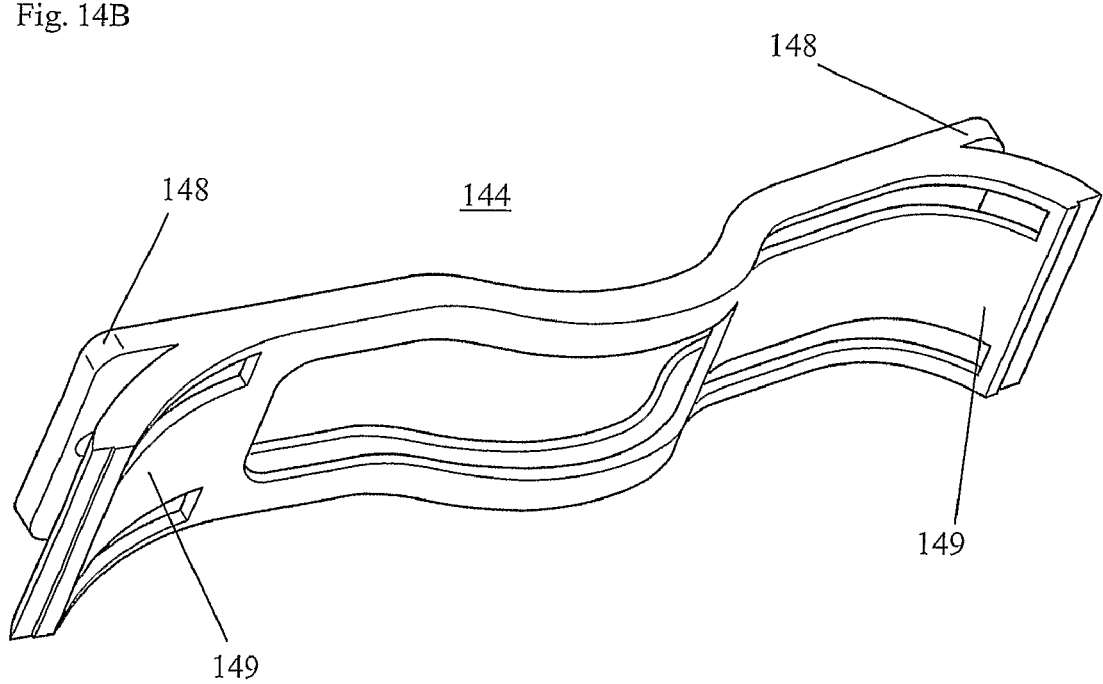

In the following, the preferred embodiments of the present invention are described by reference to the drawing. Therein shows:

FIG. 1: The parking brake lever system according to the invention in unactuated condition, shown in a side view;

FIG. 2: The parking brake lever system of FIG. 1 in actuated condition, shown in a side view;

FIG. 3: A preferred embodiment of the parking brake lever system in a front view;

FIG. 4: The parking brake lever system of FIG. 3 in a top view;

FIG. 5: The parking lever system of FIG. 3 in a three-dimensional view;

FIG. 6: The parking brake lever system of FIG. 3 in a further three-dimensional view;

FIG. 7: A sectional side view of the parking brake lever system, wherein the elements of the locking mechanism are shown;

FIG. 8: A schematic motion sequence of a parking brake lever system according to the invention from the unactuated condition (step 1) to the actuated condition (step 3);

FIG. 9: A three dimensional view of a further preferred embodiment of a parking brake lever system according to the invention in non-actuated condition;

FIG. 10: A three dimensional view of the further preferred embodiment according to FIG. 9 in actuated condition;

FIG. 11: A three dimensional view of the further preferred embodiment according to FIG. 9 from the bottom;

FIG. 12: A three dimensional partial view of the further preferred embodiment according to FIG. 9, wherein the grip is partially sectionally shown;

FIG. 13A: A three dimensional view of a preferred cover element from the top;

FIG. 13B: A three dimensional view of the preferred cover element from the bottom;

FIG. 14A: A three dimensional view of the support frame of the cover element from the top; and FIG. 14B: A three dimensional view of the support frame of the cover element from the bottom.

5. DETAILED DESCRIPTION OF THE PREFERRED EMBODIMENTS

In the following preferred embodiments of the invention are described by reference to the accompanying drawings.

In FIGS. 1 and 2 a first preferred embodiment of a parking brake lever system 1 is shown. FIG. 1 shows a parking brake lever system 1 in unactuated condition; that means that brake cable 90 is not tightened and a brake connected thereto is not actuated. FIG. 2 shows the same embodiment of parking brake lever system 1 of FIG. 1 in actuated condition. In this condition the brake cable 90 is tightened and the brakes connected thereto (not shown) are actuated.

The parking brake lever system 1 comprises a fixed support 50, preferably of sheet metal, which is suitably connected to the vehicle. A rotation axis 100 is rotatably supported within support 50. The rotation axis 100 is rigidly connected with a rotation arm 10, 12 and with a cable guiding 70.

The rotation arm 10, 12 is rotatably connected directly to the support 50 and a rotation movement of the rotation arm 10, 12 is transmitted to the cable guiding 70 via the rotation axis 100. The cable guiding 70 is an essentially flat part, at which the brake cable 90 is suitably connected, wherein the brake cable 90 can wind around the cable guiding 70. During a rotation of the cable guiding 70 in FIG. 1 in clockwise direction the brake cable 90 is wound around the cable guiding 70 and the brake cable 90 is tightened. As shown in FIG. 6, the brake cable 90 is guided within a U-shaped recess 74 at the cable guiding 70. The brake cable 90 comprises at one end thereof a threaded bolt 92, which is inserted in a receptacle 72 of the cable guiding 70 for assembly. An adjusting nut 94 is screwed onto the threaded bolt 92 for fixing and adjusting the length of the brake cable 90.

The rotation aim 10, 12 consists of an essentially elongated part, which is at one end thereof directly connected to the rotation axis 100 and thereby is rotatably supported within support 50. At the other end thereof, the rotation arm 10, 12 is pivotably connected directly with an actuation lever 20, 22. The actuation lever 20, 22 consists of a rod or bar-shaped part. As already discussed, the actuation lever 20, 22 is at one end thereof pivotably connected to the rotation arm 10, 12. At the other end thereof the actuation lever 20, 22 is connected to a hand grip 40. The handgrip 40 serves for the manual actuation of the parking brake lever system 1. A user of the parking brake lever system 1 grabs the hand grip 40 and can actuate the parking brake by means of a curved pulling movement at the hand grip 40.

Preferably, the parking brake lever system is provided, such that the hand grip 40 can be horizontally arranged within the vehicle. The curved movement of the hand grip 40 during actuation enables a particularly pleasant tightening movement, which is adapted to the ergonomics of the driver.

The actuation lever 20, 22 is slidingly supported by means of a slide support dement 34, 35, which is pivotably connected with the support 50 by means of a joint respectively axis 36. In the embodiment shown in FIG. 1, the slide support element 34, 35 is connected with a support lever 30, 32 via a joint 36, wherein the support lever 30, 32 is rigidly connected to the support 50. In this manner, the support lever 30, 32 acts as an extension of the support 50. It is also conceivable, that the support 50 and the support lever 30, 32 is integrally formed, such that the support lever 30, 32 is a component of support 50.

If the support lever 30, 32 is a separate part, which is rigidly connected to the support 50, its shape and particularly its cross section can be chosen, such that it provides a particular stability and stiffness of the parking brake lever system 1.

As shown in FIG. 7, a toothed ratchet plate 80 is fixed at the support 50, wherein the ratchet plate 80 acts for the locking of the parking brake lever system 1 in actuated condition. The ratchet plate 80 acts together with a pawl 110, which is rotatably mounted at the rotating arm 10, 12. The pawl 110 interacts with the teeth 82 of the ratchet plate 80, such that the position of the rotating arm 10, 12 can be locked in actuated condition.

For releasing, the pawl 110 is connected to an appropriate linkage and connecting means. The connecting means preferably run through the inner of the actuating lever 20, 22, and they are connected to an appropriate actuating plate 42 within hand grip 40. A pressure onto the actuating plate 42 is transmitted via the linkage to the pawl 110, such that its locking with the ratchet plate 80 is released and the rotating arm 10, 12 can again be rotated in counter clockwise direction.

As shown in FIG. 7, the linkage and connecting means for releasing of the pawl 110 comprises a pulling cable 120, which is on the one hand connected to the actuation plate 42 within handgrip 40 and on the other hand connected with a pivotable element 116, which is pivotably supported around axis 16 within actuation lever 22. A lever 114 is connected to the element 116, wherein the lever 114 transmits a movement of the element 116 to the pawl 110. The lever 114 is pivotably connected with element 116 and pawl 110 at joints 113 and 115.

For releasing the parking brake, a pressure has to be applied to the actuation plate 42, which thereby pivots preferably around axis 44. Of course, other possibilities of supporting the actuation plate 42 within hand grip 40 are also conceivable. The pulling cable 120 is tightened by the pressure on the actuation plate 42 and the pivotable element 116 is pivoted in clockwise direction (see FIG. 7). The lever 114 transmits the pivoting movement of element 116 to the pawl 110, which also pivots around its axis 112. Thereby, the pawl disengages the teeth 82 of ratchet plate 80 and the locking of the rotating arm 10, 12 is released.

For releasing of pawl 110 of course also other actuation means can be used. For example, the pawl 110 can be released by means of a rotation of the hand grip 40 around the longitudinal or around the transversal axis.

As indicated above, FIG. 1 shows the parking brake lever system in unactuated condition. To actuate the parking brake, the user pulls at the handgrip 14, wherein a pulling motion is transmitted via the actuation levers 20, 22. Since the actuation levers 20, 22 are pivotably connected with the rotation arm 10, 12 the rotation arm 10, 12 is rotated in clockwise direction. During this movement, the actuation levers 20, 22 slide within the sliding support 34, 35. By the rotation of the rotation arms 10, 12 in clockwise direction also the rotating axis 100 and the cable guiding 70 is rotated in clockwise direction. Thereby, the brake cable 90 connected to the cable guiding 70 is tightened. FIG. 2 shows the parking brake lever system 1 in tightened condition. It has to be noted, that FIG. 2 shows a particularly strong tightened condition and that of course also each intermediate position between the position in FIG. 1 and the position in FIG. 2 is possible.

In a comparison of FIGS. 1 and 2 it will be evident, that during the tightening of the parking brake the angle β between the rotation arm 10, 12 and the actuation lever 20, 22 changes. In tightened condition the angle β preferably is in a range of 85° to 95°. At an angle β of 90° between actuation lever 20, 22 and rotation arm 10, 12 the resulting lever arm of the parking brake lever system 1 is maximum, that means that the pulling force introduced onto the hand grip 40 is transmitted to the brake cable 90 most effective.

The parking brake lever system 1 preferably further comprises at least one spring 60, 62 which is suspended between the support 50 and the rotating arm 10, 12. The spring 60, 62 acts force intensifying onto the pulling force F which has to be exerted onto the handgrip 40 to tighten the brake. To this end, the springs 60, 62 are appropriately connected with the rotating arm 10, 12 and the support 50 by means of two connecting points 14, 52. In FIG. 1 it can be seen, that in unactuated condition the springs 60, 62 are essentially aligned with the rotating arm 10, 12, wherein the connecting point 52 is arranged at the support 50 in direction of the elongation of the rotating arm 10, 12 going beyond the rotating axis 100.

In the position shown in FIG. 1, which shows the untightened condition, the spring 60, 62 pulls the rotating arm 10, 12 slightly in counter clockwise direction. If now the parking brake lever system 1 is actuated, the middle axis of the springs 60, 62 initially runs through both connecting points 15, 52 and the centre point of the rotating axis 100. In this position the spring 60, 62 can introduce no force in rotating direction to the rotating arms 10, 12. If this dead center is exceeded, as it is shown in FIG. 2, the spring 60, 62 pulls the rotating arm 10, 12 in clockwise direction, so that it acts force-intensifyingly on the parking brake lever system 1.

With reference to FIGS. 3 to 6, a further preferred embodiment of the parking brake lever system 1 is shown. The FIGS. 3 to 6 show an essentially symmetrical arrangement, comprising a rotation arm 10, an actuation lever 20, as well as a support lever 30 of the right side and a rotation arm 12, an actuation lever 22 and a support lever 32 of the left side, wherein the left actuation lever 22 and the right actuation lever 20 are connected by the hand grip 40 at their ends opposed to the joint 14. Thereby, the hand grip 40 forms together with both actuation levers 20 and 22 a U-shaped arrangement.

In this embodiment the rotating arms 10, 12, the actuation levers 20, 22, the support lever 30, 32 and the springs 60, 62 are provided in duplicate. This leads to a stable, warp resistant arrangement, which guarantees a secure actuation of the parking brake. By this arrangement the single components can be made comparatively small, since each part only receives a small load.

During an actuation of the parking brake lever system 1, the hand grip 40 performs a linear motion, which is combined with a small pivoting motion. Ergonomic problems, as for example by an exclusive pivoting motion or an exclusive axial respectively linear movement of the hand grip are therefore avoided. The movement of the handgrip 40 as well as the direction of the required pulling force F is shown in the movement sequence of FIG. 8, wherein step 1 shows the unactuated condition, step 2 an intermediate position and step 3 the maximum possible tightened condition.

A further preferred embodiment of the parking brake lever system 1 is shown in FIGS. 9-12. This embodiment realizes the same functional concept as the embodiments described so far, however it is different in some features.

At first, the parking brake lever system 1 now comprises a wing 120 instead of axis 16, wherein the wing 120 connects the ends of support levers 30, 32 with each other. Thereby, these are stabilized. Preferably, the wing 120 consists of a shaped sheet metal material and is provided with two mounting flaps 122, by means of which the wing 120 can be mounted to the vehicle. Therefore, the ends of the support levers 30, 32 are particularly fixed and the complete parking brake lever system 1 is particularly stiff.

Further, the parking brake lever system 1 preferably comprises a damping plate 150 of a plastic or a rubber material. The damping plate 150 is arranged between the support 50 and the vehicle (not shown) and acts for a damping of oscillations or vibrations. In this way, the actuating sounds of the parking brake lever system 1 are not transmitted to the car body of the vehicle and motor vibrations are not introduced into the parking brake lever system 1.

As shown in FIGS. 10 and 11, the mounting 50 is further provided with mounting flaps 54, to mount the parking brake lever system 1 to the car body of the vehicle. Preferably, the mounting flaps are provided, so that production tolerances can be equalized and the parking brake lever system 1 can be used for left handed drive vehicles as well as for right handed drive vehicles.

Further, the parking brake lever system 1 can comprise at least one cover element 140, 142 for passing through of the actuation lever(s) 20, 22 into the passenger compartment of the vehicle. The passageway of the actuation lever 20, 22 is therefore nicely closed and draft or the ingress or leaking of dirt is avoided.

As shown in detail in FIGS. 12-14, the cover element 140, 142 comprises a support frame 144, which is rigidly connected to the vehicle by means of mounting areas 148. In the shown embodiment, the support frame 144 can for example be screwed, riveted or connected by means of clips at the inner lining or the car body of the vehicle.

In the support frame 144 a flat shaped slide element 146 is displaceably supported. The slide element 146 consists of a plastic strip, which can be provided with small lateral ribs, such that it can easily be bent in longitudinal direction but is comparably stiff in lateral direction. The slide element 146 is provided with a central opening 147, through which the actuation lever 20, 22 can extend. The opening 147 is adapted to the cross section of the actuation lever 20, 22.

During an actuation of the parking brake lever system 1 on the one hand the actuation lever 20, 22 moves axially within opening 147, on the other hand the slide element 146 is displaced within the support frame 144 due to the pivoting movement of the actuation lever 20, 22.

The FIGS. 13A and 13B, as well as 14A and 14B show preferred embodiments of such a cover element 140 and a support frame 144, respectively. Herein the support frame is bend perpendicularly to the displacement direction of the slide element 146, such that the slide element can be slid to end areas 149 behind the mounting areas 148. The end areas 149 therefore are arranged behind the mounting areas 148, as seen from the driver, and are in that way not visible anymore after the mounting. Therefore, the slide element 146 partially disappears under the lining of the vehicle during actuation. The length of the slide element 146 is chosen such that the slide element 146 covers the passage area in every actuation position.

Preferably, the support frame 144 comprises a double wave shape, as shown in FIGS. 12-14. So, the hand grip 40 can be sunk into the lining, as indicated in FIG. 12, such that the parking brake lever system 1 is better integrated in to vehicle's design.

In FIG. 12 it is also shown, that hand grip 40 can be provided with a lateral release knob 46, which releases the locking mechanism 80, 110 similarly to the actuation plate 42.

LIST OF REFERENCE SIGNS 1 parking brake lever system
10, 12 rotating arms
14 connecting point
16 axis, joint
20, 22 actuation lever
30, 32 support lever
34, 35 slide support element
36 axis, joint
40 hand grip
42 actuation plate
44 pivoting axis of actuation plate
46 release knob
50 support
52 connecting point
54 mounting flap
60, 62 springs
70 cable guiding
72 receptacle
74 recess
80 ratchet plate
90 brake cable
92 threaded bolt
94 adjusting nut
100 rotation axis
110 pawl
112 pivoting axis of pawl
113, 115 joints 114 lever
116 pivotable element
118 pulling cable
120 wing
122 mounting flaps
140, 142 cover element
144 support frame
146 slide element
147 opening
148 mounting area
149 end area

The invention claimed is:

1. Parking brake lever system (1) for manually tightening and releasing of at least one brake cable (90), comprising:
   a) at least two rotation arms (10, 12) pivotably supported at a fixed support (50), wherein the rotation arms (10, 12) are connected to the brake cable (90); and
   b) at least two actuation levers (20, 22), which at a first end thereof are pivotably connected to the rotation arms (10, 12) and which at a second end thereof are rigidly connected to a hand grip (40), the hand grip (40) connecting the actuation levers (20, 22) with each other to form a substantially U-shaped arrangement (20, 22, 40); wherein
   c) the actuation levers (20, 22) are slidingly supported at the fixed support (50), such that the hand grip (40) defines a curved path during actuation of the parking brake lever system (1).

2. Parking brake lever system according claim 1, wherein the actuation levers (20, 22) have an elongate shape, and wherein each is slidingly supported between the first end, which is connected to one of the rotation arms (10, 12), and the second end, which is connected to the hand grip (40).

3. Parking brake lever system according to claim 1, further comprising a slide support element (34, 35), which is pivotably supported at the fixed support, for the sliding support of the actuation levers (20, 22).

4. Parking brake lever system according to claim 1, further comprising at least one tension spring (60, 62), which is suspended between the rotation arms (10, 12) and the fixed support (50) to apply a tension force to the rotation arms (10, 12) in a tightening direction during actuation of the parking brake lever system (1).

5. Parking brake lever system according to claim 1, further comprising a cable guiding (70), which is rigidly connected to the rotation arms (10, 12) and which comprises a recess (74) in which the brake cable (90) is guided.

6. Parking brake lever system according claim 5, wherein the cable guiding (70) comprises a receptacle (72), at which the brake cable (90) is length-adjustably connected.

7. Parking brake lever system according to claim 1, further comprising at least one support lever (30, 32) which is rigidly connected to the fixed support (50) and pivotably connected to a slide support element (34, 35) to support the actuation levers (20, 22).

8. Parking brake lever system according to claim 1, wherein the angle (α) between rotation arms (10, 12) and actuation levers (20, 22) ranges between 85° and 95° when the brake cable (90) is tightened.

9. Parking brake lever system according to claim 1, further comprising an actuation plate (42) arranged within hand grip (40) for releasing of the parking brake.

10. Parking brake lever system according to claim 1, wherein the releasing of the parking brake is performed by rotating of the hand grip (40).

11. Parking brake lever system according to claim 1, further comprising a wing (120), which connects the ends of the support levers (30, 32) with each other.

12. Parking brake lever system according claim 11, wherein the wing (120) is rigidly mounted to a vehicle.

13. Parking brake lever system according to claim 1, further comprising a damping plate (150), which is mounted between the support (50) and the vehicle for damping of vibrations.

14. Parking brake lever system (1) for manually tightening and releasing of at least one brake cable (90), comprising:
   a) at least one rotation arm (10, 12) pivotably supported at a fixed support (50), wherein the rotation arm (10, 12) is connected to the brake cable (90); and
   b) at least one actuation lever (20, 22), which at a first end thereof is pivotably connected to the rotation arm (10, 12) and which at a second end thereof is rigidly connected to a hand grip (40); wherein
   c) the actuation lever (20, 22) is slidingly supported at the fixed support (50), such that the hand grip (40) defines a curved path during actuation of the parking brake lever system,
   d) at least one cover element (140, 142) comprising a support frame (144), which is rigidly mounted to a vehicle, a slide element (146), which is displaceably supported within the support frame (144), the support frame (144) being curved perpendicularly to the displacement direction of the slide element (146), wherein the actuation lever (20,22) extends through the slide element (146).

15. Parking brake lever system according claim 14, wherein the curvature of the support frame (144) comprises a wave shape.

16. Parking brake lever system (1) for manually tightening and releasing of at least one brake cable (90), comprising:
   a) at least one rotation arm (10, 12) pivotably supported at a fixed support (50), wherein the rotation arm (10, 12) is connected to the brake cable (90); and
   b) at least one actuation lever (20, 22), which at a first end thereof is pivotably connected to the rotation arm (10, 12) and which at a second end thereof is rigidly connected to a hand grip (40) the actuation lever (20, 22) being slidingly supported at the fixed support (50), such that the hand grip (40) defines a curved path during actuation of the parking brake lever system; and
   c) at least one tension spring (60, 62), suspended between the rotation arm (10, 12) and the fixed support (50), the tension spring (60, 62) moving over-center from a first position in which the tension spring (60, 62) applies a force in a direction to release the brake cable (90) to a second position in which the tension spring (60, 62) applies a force in a direction to tighten the brake cable as the rotation arm (10, 12) is moved from a released position to an actuated position.

* * * * *